(12) United States Patent
Talluri

(10) Patent No.: US 10,552,509 B2
(45) Date of Patent: *Feb. 4, 2020

(54) METHOD AND SYSTEM FOR ARCHIVING AND RETRIEVING BIBLIOGRAPHY INFORMATION AND REFERENCE MATERIAL

(71) Applicant: Srikrishna Talluri, Holly, MI (US)

(72) Inventor: Srikrishna Talluri, Holly, MI (US)

(73) Assignee: Talsk Research, Inc., Prospect Heights, IL (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/331,961

(22) Filed: Jul. 15, 2014

(65) Prior Publication Data

US 2014/0330790 A1    Nov. 6, 2014

Related U.S. Application Data

(63) Continuation of application No. 11/544,916, filed on Oct. 9, 2006, now abandoned, which is a continuation
(Continued)

(51) Int. Cl.
*G06F 17/00* (2006.01)
*G06F 16/958* (2019.01)
(Continued)

(52) U.S. Cl.
CPC .......... *G06F 16/958* (2019.01); *G06F 16/955* (2019.01); *G06F 16/95* (2019.01);
(Continued)

(58) Field of Classification Search
CPC ............. G06F 17/3089; G06F 17/3011; G06F 17/30864; G06Q 10/10; G06Q 30/02
(Continued)

(56) References Cited

U.S. PATENT DOCUMENTS 5,367,621 A    11/1994  Cohen et al.
5,530,899 A     6/1996  Macdonald
(Continued)

FOREIGN PATENT DOCUMENTS

EP    1006466 A2    6/2000
WO    0039713 A1    7/2000

OTHER PUBLICATIONS

"Reference Linking for Journal Article" Published by D-Lib Magazine Jul./Aug. 1999 vol. 5 No. 7/8 ISSN 1082-9873 pp. 1-16.*
(Continued)

*Primary Examiner* — Quoc A Tran
(74) *Attorney, Agent, or Firm* — Endurance Law Group PLC

(57) ABSTRACT

A method and system for using the Internet to archive and retrieve web-based reference material includes a first communications device connected to the Internet. A database receives from a user via the first communications device a URL or other identification of certain reference material on the World Wide Web. After receiving the identification information from the user, the database obtains and stores a copy of the reference material and associates with it a distinctive key. A second communications device is connected to the Internet for an audience of the reference material to use. The database receives from the audience via the second communications device the distinctive key representing a request for a copy of the identified reference material. The database transmits a copy of the web-based reference material to the audience.

23 Claims, 3 Drawing Sheets

Related U.S. Application Data of application No. 09/711,791, filed on Nov. 13, 2000, now Pat. No. 7,178,097.

(51) Int. Cl.
| | |
|---|---|
| *G06F 16/955* | (2019.01) |
| *G06Q 30/02* | (2012.01) |
| *G06Q 10/10* | (2012.01) |
| *G06F 16/951* | (2019.01) |
| *G06Q 30/06* | (2012.01) |
| *G06Q 10/00* | (2012.01) |
| *G06F 16/95* | (2019.01) |

(52) U.S. Cl.
CPC ........ *G06F 16/951* (2019.01); *G06F 16/9554* (2019.01); *G06Q 10/00* (2013.01); *G06Q 10/10* (2013.01); *G06Q 30/02* (2013.01); *G06Q 30/06* (2013.01)

(58) Field of Classification Search
USPC .................................................. 715/200–208
See application file for complete search history.

(56) References Cited

U.S. PATENT DOCUMENTS

| | | | |
|---|---|---|---|
| 5,557,790 A | 9/1996 | Bingham et al. | |
| 5,649,192 A | 7/1997 | Stucky | |
| 5,727,156 A | 3/1998 | Herr-Hoyman et al. | |
| 5,870,552 A | 2/1999 | Dozier et al. | |
| 5,870,770 A | 2/1999 | Wolfe | |
| 5,873,107 A | 2/1999 | Borovoy et al. | |
| 5,941,944 A | 8/1999 | Messerly | |
| 5,963,966 A | 10/1999 | Mitchell et al. | |
| 5,970,505 A | 10/1999 | Ebrahim | |
| 5,983,214 A | 11/1999 | Lang et al. | |
| 5,983,267 A | 11/1999 | Shklar et al. | |
| 5,987,454 A | 11/1999 | Hobbs | |
| 6,009,442 A | 12/1999 | Chen et al. | |
| 6,135,646 A | 10/2000 | Kahn et al. | |
| 6,366,933 B1 * | 4/2002 | Ball ...................... | G06F 16/957 715/203 |
| 6,460,036 B1 | 10/2002 | Herz | |
| 6,560,618 B1 | 5/2003 | Ims | |
| 6,625,624 B1 | 9/2003 | Chen et al. | |
| 6,725,203 B1 | 4/2004 | Seet et al. | |
| 6,924,827 B1 | 8/2005 | Gulati et al. | |
| 6,959,308 B2 | 10/2005 | Gramsamer et al. | |
| 7,120,862 B1 | 10/2006 | Ong | |
| 7,418,655 B2 | 8/2008 | Ong | |
| 7,581,006 B1 * | 8/2009 | Lara .................... | H04L 67/1008 709/217 |
| 2001/0016851 A1 * | 8/2001 | Gramsamer ...... | G06F 17/30011 |
| 2002/0002513 A1 * | 1/2002 | Chiasson ............... | G06Q 30/06 705/26.8 |
| 2002/0013828 A1 | 1/2002 | Kashiwabara et al. | |
| 2002/0016789 A1 | 2/2002 | Ong | |
| 2002/0120648 A1 | 8/2002 | Ball et al. | |
| 2002/0152215 A1 | 10/2002 | Clark et al. | |
| 2005/0108626 A1 * | 5/2005 | Ong ...................... | G06F 16/951 715/205 |

OTHER PUBLICATIONS

Priscilla Caplan, et al. ("Reference Linking for Journal Article" Published by D-Lib Magazine Jul./Aug. 1999 vol. 5 No. 7/8 ISSN 1082-9873 pp. 1-16.*
Atkins et al., "Reference Linking with DOIs, A Case Study", D-Lib Magazine, Feb. 2000, vol. 6, No. 2, ISSN 1082-9873, XP-002322865.
Caplan et al. "Reference Linking for Journal Article" D-Lib Magazine Jul./Aug. 1999 vol. 5, No. 7/8 ISSN 1082-9873 pp. 1-16.
Carlson, "Here Today, Gone Tomorrow: Studying How Online Footnotes Vanish", The Chronicle of Higher Education, Information Technology, Apr. 30, 2004, pp. 1-3.
Carlson, "Scholars Note 'Decay' of Citations to Online References", The Chronicle of Higher Education, Information Technology, Mar. 18, 2005, p. 1-5.
Lawrence et al., "Digital Libraries and Autonomous Citation Indexing", Research Feature, Jun. 1999, XP-000829616.
The Chronicle of Higher Education, "About the Chronicle, online and in print" http://web.archive.org/web/19991008184803/chronicle.com/about-help.dir/atinfo.htm, 6 pages.
U.S. Appl. No. 60/243,259, filed Oct. 25, 2000, Clark et al.
Atkins et al., "Reference Linking with DOIs: a case study" Feb. 2000, in D-Lib Magazine vol. 6 No. 2, pp. 1-13, http://www.dlib.org/dlib/february00/02risher.html.
Cameron, R.D., "A universal citation database as a catalyst for reform in scholarly communication" First Monday Munksgaard International Publishers Denmark, [Online]] vol. 2, No. 4 , Apr. 7, 1997, http://cybra.lodz.pl/Content/1081/Issues/issue2_4/cameron/index.html.
Caplan et al., Reference Linking for Journal Articles, Jul./Aug. 1999, in vol. 5 No. 7/8 of D-Lib Magazine; http://www.dlib.org/dlib/july99/caplan/07caplan.html.
Cooper et al., "The Stanford Archival Vault: A reliable, long-term data archive" Dec. 1999, http://infolab.stanford.edu/~cooperb/pubs/ia.pdf.
Phillips, Margaret E., "The National Library of Australia: Ensuring Long-Term Access to Online Publications" vol. 4, Issue 4: Onlookers Comment on the E-Pub Scene, May, 1999 ('NLA Article—1999') https://quod.lib.umich.edu/j/ep/3336451.0004.405?view=text;rgn=main.
Golding et al., "The refdbms distributed bibliographic database system" USENIX Winter 1994 Technical Conference https://www.usenix.org/legacy/publications/library/proceedings/sf94/full_papers/golding.pdf.
Hitchcock et al., "Developing services for open eprint archives: globalization, integration and the impact of links" 5th ACM Conference on Digital Libraries, San Antonio, Texas, Jun. 2000, http://cogprints.org/1644/1/harnad00.acm.htm.
Hodge et al., "Digital Electronic Archiving: The State of the Art and the State of the Practice" Apr. 26, 1999; 'Gail Report' (http://www.icsti.org/IMG/pdf/digarch99_TOC-2.pdf, http://www.icsti.org/IMG/pdf/digarch99_Exec-2.pdf, http://www.icsti.org/IMG/pdf/digarch99_Main-2.pdf).
Hodge, Gail M., "Best Practices for Digital Archiving: An Information Life Cycle Approach" Jan. 2000 in vol. 6 No. 1 of D-Lib Magazine; http://www.dlib.org/dlib/january00/01hodge.html.
Lawrence et al., "Digital libraries and autonomous citation indexing" IEEE Computer, vol. 32 Issue 6, pp. 67-71, 1999, https://clgiles.ist.psu.edu/papers/IEEE.Computer.DL-ACI.pdf.
Morrison, Ian, www.nla.gov.au/Pandora: Australia's internet archive of Mar. 1999 pp. 2-15: http://www.tandfonline.com/doi/pdf/10.1080/00049670.1999.10755889.
Petition for Inter Partes Review of U.S. Pat. No. 7,178,097, IPR case No. 2017-01154.
Declaration of Stephen Gray, submitted in support of petitioner in IPR case No. 2017-01154.

* cited by examiner

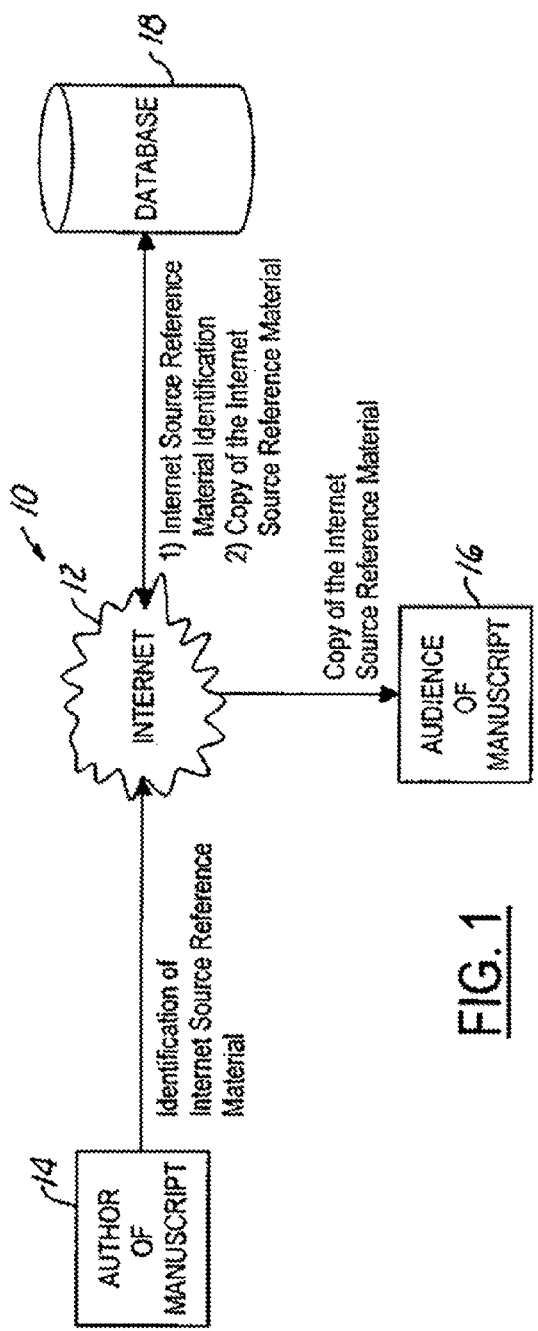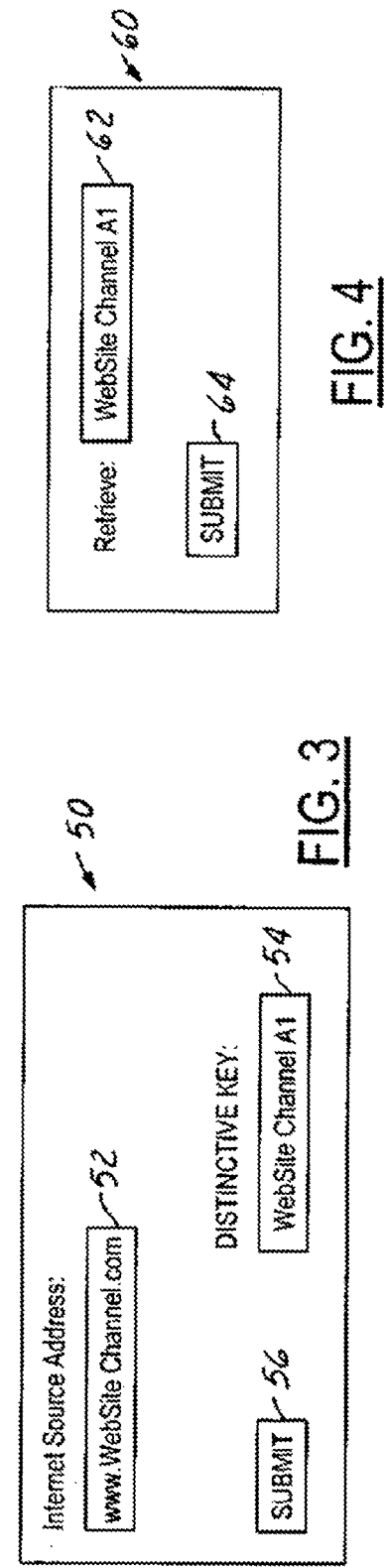

REFERENCES — 70

1) www.WebSite Channel.com, accessed September 2000, last modified August 2000, Key = WebSite Channel AI. ← 72

2) www. Internet Source Info.com, accessed May 2000, last modified January 2000, Key = Internet Source Info B3.

3) Engines, Heywood, pp 01-101, 1998, Key = Engines - Heywood. ← 74

4) Krish email, October 4, 2000, Key = Krish email Oct 4, 2000.

5) Engine Seminar Audio Conference, Detroit July 2000, Key = Engine Seminar Audio Conference - Detroit, 2000.

6) Krish letter to Heywood, October 1, 2000, Key = Krish Letter to Heywood.

FIG. 5

METHOD AND SYSTEM FOR ARCHIVING AND RETRIEVING BIBLIOGRAPHY INFORMATION AND REFERENCE MATERIAL

CROSS REFERENCE TO RELATED APPLICATIONS

This application is a continuation of U.S. application Ser. No. 11/544,916, filed Oct. 9, 2006, published as US2007/0033208 on Feb. 8, 2007, which is a continuation of U.S. application Ser. No. 09/711,791, filed Nov. 13, 2000, now U.S. Pat. No. 7,178,097, the entire disclosures of which are hereby incorporated by reference and relied upon.

BACKGROUND OF THE INVENTION

Field of the Invention

The present invention relates generally to publishing and, more particularly, to a method and system for using a communications network such as the Internet to archive and retrieve bibliography information and reference material cited in a manuscript.

Description of Related Art

Authors of manuscripts and documents such as books and research papers frequently cite material such as articles and other books in bibliography section. The bibliography section is usually attached to the end of a manuscript. (The terms "Works Cited" and "References" mean the same. Each is a list of works that have been cited by an author, or works to which an author has made a reference. However, the term "Bibliography" stands for a list of all the material an author has consulted in preparing a manuscript irrespective of whether or not it has been cited.) Herein, the term "Bibliography" also represents the terms "Works Cited" and "References".

The entire manuscript including the bibliography section is then copied for distribution to an audience. The author uses the cited reference material as a source of information for writing the manuscript. Traditionally, the reference material has been limited to physical media such as other books, research papers, newspaper and magazine articles, and the like. Occasionally, personal communications (regular mail), works-in-progress (interim reports, confidential reports), are also cited by authors of manuscripts.

However, information available on websites on the World Wide Web, e.g, the Internet, has become an indispensable source for research on several areas of interest and often makes a study more comprehensive. Information can be retrieved instantly from the Internet at any time from any location and may incorporate the most current news. Web based information is not merely an electronic version of a physical publication (such as newspapers and magazines) but is rather a standalone medium with no physical equivalents or limitations (i.e., page size).

Authors and researchers are now starting to cite information from websites in their manuscripts. Various professional bodies have issued protocols for citing web content. In the bibliography section, authors generally include three pieces of information when citing web content. The first piece of information is the address of the website such as a Uniform Resource Locator (URL), for instance, www.website.com. The second piece of information is the date of access of the website (by the author) and the third piece of information is the last modified date of the website.

A problem with citing websites as sources of information is that 1) websites are subject to frequent, invisible modifications and 2) may be moved to a new address or removed from the Internet without notice. Moreover, material from a website once accessible to everyone may now be limited to a select audience. Even hypertext essays (published on the Internet itself) now often contain a list of other websites used in that study.

An important reason for citing references from any source including the Internet and traditional published material is to enable verification of the material used from the references. The bibliography section of a manuscript also becomes a resource of information for other researchers in that field. Referees of research papers, editors, other researchers and the audience of the manuscript need to review/verify the information taken from the cited references. Traditionally, the bibliography information is either given in alphabetical order or the order in which the material was used in the manuscript, with a description of the journal or magazine from which it was taken (source), title of the particular essay, editor or author name, volume number of the journal or magazine, date of publication, and particular pages where the content was assimilated. Such information enabled easy review/verification of the bibliography information or reference material.

The problem with citing a website is that the fluid, ever modifiable potential of the content of the website does not guarantee availability and true verification of the material actually used by the author.

Further, information given out by interacting members of news groups (another Internet source) and through personal communication methods such as e-mails that are cited by an author as references cannot be verified by a third party unless the information is reproduced verbatim by the author in the content of the manuscript or in the bibliography section. Authors may also cite works in progress (such as unpublished interim reports) and information obtained through personal communication methods such as regular mail. However, the problem of the inability to review/verify such material also ails these sources.

While traditional publishers generally act as authenticators for the material printed and circulated by them there exists no credibility checking service or protocol for information available over the Internet. Search engines used for selecting websites by keywords give worthy, mediocre, and worthless websites equal importance. So, while it can be considered safe to look up and use content published in a magazine or journal, which are thus authenticated, it might be risky to use content from most web sites (that don't have any means of authentication) in a manuscript.

As such, in light of the affect the cited web based material might have had on a given manuscript, it becomes important for referees, editors, other researchers, and the audience of the manuscript to ascertain the credibility of the cited information available on those Internet websites (sources). The same can be said of hitherto non-verifiable sources such as interim reports, e-mails, communication on newsgroups/userforums, personal communications (regular mail) and the like.

BRIEF SUMMARY OF THE INVENTION

Accordingly, it is an object of the present invention to provide a method and system for using a communications network to archive and retrieve bibliography information and reference material cited in a manuscript.

It is another object of the present invention to provide a method and system for using a communications network to archive and retrieve bibliography information reference material from an Internet source such as a website cited in a manuscript.

It is a further object of the present invention to provide a method and system for using a communications network to archive a copy of information from an Internet source cited in a manuscript.

It is still another object of the present invention to provide a method and system for using a communications network to archive a copy of information from an Internet source cited in a manuscript for retrieval by users of the manuscript to enable verification of the cited Internet source information.

It is still a further object of the present invention to provide a method and system for using a communications network to archive and retrieve bibliography information and reference material from personal communications such as e-mails and regular mail cited in a manuscript.

It is still yet another object of the present invention to provide a method and system for using a communications network to archive and retrieve bibliography information and reference material from a digital medium such as audio digital files, video digital files, and graphics digital files cited in a manuscript.

It is still yet a further object of the present invention to provide a method and system for using a communications network to archive and retrieve bibliography information and reference material from traditional physical sources of information such as books and magazines, interim reports, and works-in-progress cited in a manuscript.

In carrying out the above objects and other objects, the present invention provides a system for archiving manuscript references. The system includes a database in communication via the Internet with an author of a manuscript and an audience of the manuscript. The database receives via the Internet the address of a web site being used by the author as a reference for the manuscript, uses the web site address to obtain a copy of the web site from the Internet upon receiving the web site address such that the copy of the web site is the same as the web site as on the Internet at the time the author used the web site as a reference for the manuscript, and stores the copy of the web site along with a distinctive key. The database transmits via the Internet the copy of the web site to the audience in response to receiving the key from the audience such that the audience receives a copy of the web site as on the Internet at the time the author used the web site as a reference for the manuscript. The database may transmit via the Internet the key to the author. The database may store the web site address along with the copy of the web site and the key.

In carrying out the above objects and other objects, the present invention provides a method for archiving manuscript references. The method includes an author of a manuscript using a web site on the Internet as a reference for the manuscript. The author transmits via the Internet the address of the web site to a database connected to the Internet. The database uses the web site address to obtain a copy of the web site from the Internet upon receiving the web site address such that the copy of the web site is the same as the web site as on the Internet at the time the author transmitted the web site address. The database stores the copy of the web site with a distinctive key. The author cites the web site as being a reference for the manuscript by listing the key in the manuscript. An audience of the manuscript obtains the key from the manuscript. The audience transmits via the Internet the key to the database to request the database for the copy of the web site. The database transmits via the Internet the copy of the web site to the audience in response to receiving the key from the audience such that the audience receives a copy of the web site as on the Internet at the time the author transmitted the web site address.

The database may associate the key with the copy of the web site. In this case, the method may further include the database transmitting via the Internet the key to the author.

The database may store the web site address along with the copy of the web site and the key. The author may associate the key with the copy of the web site. In this case, the author transmits via the Internet the key to the database.

The author may use an e-mail as a reference for the manuscript. In this case, the author transmits via the Internet a copy of the e-mail to the database for the database to store; and the database transmits via the Internet a copy of the e-mail to the audience in response receiving a request for a copy of the e-mail from the audience.

The author may use a digital file as a reference for the manuscript. In this case, the author transmits via the Internet a copy of the digital file to the database for the database to store; and the database transmits via the Internet a copy of the digital file to the audience in response receiving a request for a copy of the digital file from the audience.

The author may use a paper book as a reference for the manuscript. In this case, the author transmits via the Internet an electronic scanned copy of the paper book to the database for the database to store; and the database transmits via the Internet a copy of the electronic scanned copy of the paper book to the audience in response to receiving a request for a copy of the electronic scanned copy of the paper book from the audience.

In carrying out the above objects and other objects, the present invention provides a method. This method includes transmitting to a database an identifier of a web site cited as a reference in a manuscript prior to any modifications to the web site as on the Internet after the web site has been cited. Upon the database receiving the identifier, the database uses the identifier to obtain from the Internet a copy of the web site such that the copy of the web site is the same as the web site as on the Internet at the time the web site was cited. A unique key is assigned to the copy of the web site. The copy of the web site with the key are stored in the database. Citing the web site includes listing the key in the manuscript. An audience obtains the key from the manuscript. The database transmits the copy of the web site to the audience in response to the database receiving the key from the audience such that the audience receives a copy of the web site as on the Internet at the time the web site was cited.

This method may further include accessing the Internet to locate the web site prior to citing the web site. Assigning a unique key to the copy of the web site may include the database assigning the key to the copy of the web site. This method may further include transmitting by the database the key to an author of the manuscript. In this case, listing the key in the manuscript includes the author listing the key in the manuscript. This method may further include citing the web site includes the author listing the web site address, the key, and the time at which the web site was accessed in the manuscript. This method may further include the audience transmitting the key to the database after obtaining the key from the manuscript.

The advantages associated with the method and system of the present invention are numerous. The method and system of the present invention advantageously fill the deficiency associated with conventional bibliographic processes by identifying traditionally non-verifiable reference material cited in a manuscript with a distinctive key and then archiving a copy of the reference material on a database connected to a communications network such as the Internet. The audience of the manuscript may then access the reference material from the database by using the distinctive key for review and verification of the reference material. As a result, the method and system of the present invention protect the cited information from continuous modification and removal of the reference material by providing an avenue for the audience to gain access to an exact copy of the reference material cited by the author of the manuscript. Further, the method and system of the present invention provide a means of verification of the reference material.

The above objects and other objects, features, and advantages of the present invention are readily apparent from the following detailed description of the best mode for carrying out the present invention when taken in connection with the accompanying drawings.

BRIEF DESCRIPTION OF THE SEVERAL VIEWS OF THE DRAWINGS

These and other features and advantages of the present invention will become more readily appreciated when considered in connection with the following detailed description and appended drawings, wherein:

FIG. 1 illustrates a block diagram of a system in accordance with an embodiment of the present invention;

FIG. 3 illustrates a graphical user interface for use by the author of a manuscript to transfer the address of a website cited in the manuscript to the database of the system shown in FIG. 1;

FIG. 4 illustrates a graphical user interface for use by the audience to receive a copy of a website cited in a manuscript from the database of the system shown in FIG. 1; and FIG. 5 illustrates an example of a bibliography section in accordance with an embodiment of the method and system of the present invention.

DETAILED DESCRIPTION OF THE INVENTION

Figure 2:
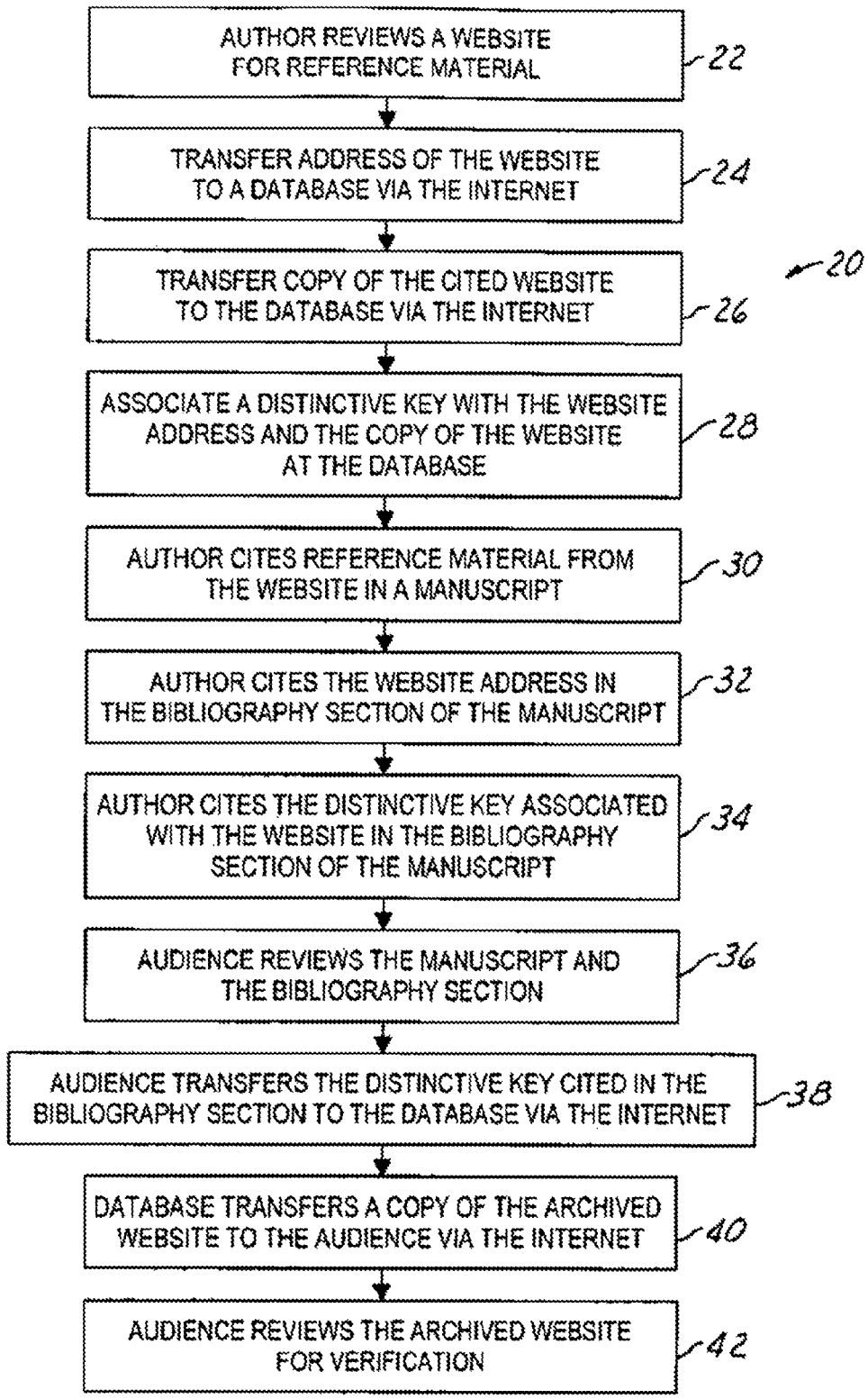
FIG. 2 illustrates a flow chart describing operation of the method and system in accordance with an embodiment of the present invention.

In general, the present invention provides a method and system for using a communications network such as the Internet, wired and wireless data communications networks, and the like to archive and retrieve bibliography information and reference material cited in a manuscript. In operation, an author cites material from an information source such as an Internet source in the manuscript and then adds information identifying the Internet source into the bibliography section of the manuscript. The reference material from the Internet source may be from a website. The Internet source identification information may include the address of the website, i.e, the uniform resource locator (URL), the date of access of the website by the author, and the last modified date of the website. The website identification information is then transferred to the Internet for storage on a database associated with the manuscript. In addition to the website identification information, a copy of the website information is also transferred to the Internet for storage on the database. The database assigns a permanent distinctive key (other than the URL identifying the website) to the website identification information and the copy of the website. The distinctive key can then be used by readers of the manuscript to gain access to the website information cited by the author of the manuscript as the website stood on the date of submission by the author to the database.

The database acts as the bibliography of the manuscript by including a listing of information for each website cited in the manuscript. However, the database is more than a bibliography in that a copy in verbatim of each website used by the author is also stored on the database. In effect, the database archives the reference material for subsequent retrieval. Accordingly, if the website is modified or removed from the Internet after the date of access by the author or after the manuscript is distributed to an audience, the audience may access the database to retrieve the actual website information used by the author for review and verification.

Additionally, the method and system in accordance with an embodiment of the present invention extend to the identification and archival of other reference material such as works-in-progress, e-mails, regular mail, digital files, and traditional physical media by assigning a distinctive key to a copy of each such material and storing the distinctive key and the copy in the database for subsequent retrieval from the database.

Referring now to FIG. 1, a block diagram of a system 10 for use with an embodiment of the present invention is shown. System 10 includes a communications network 12 such as the Internet. An author 14 of a manuscript or document ("manuscript") and an audience 16 of the manuscript are connected with Internet 12 for transferring and receiving information from the Internet. A database 18 is also connected to Internet 12 for transferring and receiving information from the Internet. Author 14 uses Internet 12 to cite reference material from Internet sources in the manuscript. The Internet sources may be websites on Internet 12. Author 14 includes a bibliography section within the manuscript for listing the identification of the reference materials from the Internet sources and other sources. The bibliography section is intended to be reviewed by audience 16 for reviewing and verifying the reference material cited by author 14 in the manuscript. It is noted that the manuscript may be published or remain unpublished.

When citing a website as reference material in the manuscript, author 14 cites information identifying the website in the bibliography section of the manuscript. The identification information of the website in the bibliography section includes the address of the website such as a URL, the date of access of the website by the author, and the last modified date of the website. Author 14 then transfers to Internet 12 information identifying the website as shown in FIG. 1. The website identification information transferred to Internet 12 includes the address of the website. In response to author 14 transferring the website identification information to Internet 12, database 18 receives from the Internet the website identification information and a copy of the reference material of the website, i.e., a copy of the website. The copy of the website is verbatim to the website on Internet 12 when author 14 transferred the website identification information to the Internet. Database 18 then stores or archives the website identification information with the copy of the website.

Database 18 assigns a permanent distinctive key (other than the URL identifying the website) to the website identification information and the copy of the website. Author 14 includes the distinctive key in the bibliography section with the website identification information. Audience 16 of the manuscript may then access Internet 12 to retrieve the copy of the website cited in the manuscript and in the bibliography section. In response to a request by audience 16 to Internet 12 for access to the copy of the website, database 18 transfers the archived copy of the web site to the audience via the Internet. As part of the request, audience 16 transfers the distinctive key provided by author 14 in the bibliography section of the manuscript to database 18 via Internet 12. Database 18 uses the distinctive key to understand what reference material audience 16 is requesting. Audience 16 can then review the reference material from the website cited in the manuscript by author 14 for verification. The copy of the website provided by database 18 to audience 16 is an exact copy of the website when author 14 cited the website in the manuscript and submitted to database 18.

In effect, database 18 acts as a partial bibliography of the manuscript by including a listing of information for each website cited in the manuscript, and further includes a copy in verbatim of each website used by author 14. Database 18 archives the website for subsequent retrieval such that if the website is modified or removed from Internet 12 subsequent to the author citing the website, audience 16 may access the database to retrieve the actual website used by the author for review and verification.

Referring now to FIG. 2, a flow chart 20 describing operation of the method and system in accordance with an embodiment of the present invention is shown. Flow chart 20 begins with author 14 reviewing a website on Internet 12 for reference material as shown in block 22. Upon finding reference material of interest, author 14 transfers the website address to database 18 via Internet 12 as shown in block 24. A copy of the website referenced by author 14 is then also transferred to database 18 via Internet 12 as shown in block 26. This copy may be sent from Internet 12 to database 18 in response to a request for such copy by the database. Database 18 stores and archives the website address and the copy of the website for subsequent retrieval. Database 18 archives this information because either the website address or the website itself may possibly be removed or altered after being cited by author 14. By archiving this information, database 18 ensures that a verbatim copy of the website as cited by author 14 may be accessible for later study and verification. As part of the archiving process, database 18 associates a distinctive key (other than the URL) with the website address and the copy of the website as shown in block 28.

Author 14 then cites the reference material from the website in a manuscript being written by the author as shown in block 30. Author 14 then cites the address of the website such as the website URL in the bibliography section of the manuscript as shown in block 32. Author 14 may also cite in the bibliography section the date of access of the website and the last modified date of the website.

Author 14 then cites the distinctive key associated with the website in the bibliography section of the manuscript as shown in block 34. After distribution of the manuscript to audience 16, the audience reviews the manuscript and the bibliography section of the manuscript as shown in block 36. In order to verify the reference material of a website cited by author 14 in the manuscript, audience transfers a request along with the distinctive key cited in the bibliography section to database 18 via Internet 12 as shown in block 38. In response to receiving the request and the distinctive key from audience 16, database 18 transfers a copy of the archived website along with the website address to the audience via Internet 12 as shown in block 40. Audience 16 then reviews the archived website for verification of the reference material cited by author 14 in the manuscript as shown in block 42.

In addition to obtaining a copy of the archived website from database 18 over Internet 12, audience 16 may directly obtain a copy of the archived website from database 18 using traditional communications means such as regular post mail, courier, facsimile, and the like. Further, if the manuscript is a hypertext document, then audience 16 may click a hypertext distinctive key link located in the hypertext document. The hypertext distinctive key link is associated with the archived reference material. Upon audience 16 clicking the hypertext distinctive key link database 18 transfers a copy of the archived reference material to the audience via Internet 12.

Referring now to FIG. 3, a graphical user interface 50 for use by author 14 to transfer the address of a cited website to database 18 is shown. Graphical user interface 50 is part of a communications system enabling communication between author 14 and database 18 via Internet 12. Graphical user interface 50 includes an Internet source address entry 52 and a distinctive key entry 54. Author 14 enters the address of a cited website in Internet source address entry 52. For instance, the address is "www.WebSiteChannel.com" as shown in FIG. 3. Author 14 then enters a distinctive key to be associated with the cited website in distinctive key entry 54. For instance, the distinctive key is "WebSiteChannel A1" as shown in FIG. 3. (Alternatively, the distinctive key may be assigned by database 18 and then given by the database to author 14 as described above.) Upon entering the required information, author 14 presses a submit button 56 to transfer the entered information to database 18 via Internet 12. Database 18 then accesses Internet 12 to receive a copy of the website at the time of submission of the entered information by author 14. Database 18 archives the entered information, i.e., the website address and the distinctive key, with the copy of the website.

Referring now to FIG. 4, a graphical user interface 60 for use by audience 16 to receive a copy of the cited website from database 18 is shown. Graphical user interface 60 is part of a communications system enabling communication between audience 16 and database 18 via Internet 12. Graphical user interface 60 includes an Internet source retrieve entry 62. Audience 16 enters the distinctive key associated with the cited website in Internet source retrieve entry 62. Upon entering the requested distinctive key information, audience 16 presses a submit button 64 to request database 18 via Internet 12 to provide the audience with a copy of the cited website. In response to the request, database 18 transfers a copy of the cited website to audience 16 via Internet 12. Audience 16 may then study and verify the cited website with the manuscript.

In addition to archiving website information, database 18 is further operable for archiving copies of other reference materials cited in a manuscript such as works-in-progress, e-mails, regular mail, digital files such as audio files, video files, and graphics files, and traditional physical media such as paper books and magazines. For example, the reference material cited by author 14 in a manuscript is an e-mail. In this case, author 14 transfers a copy of the cited e-mail to database 18 via Internet 12. In response to receiving the e-mail copy database 18 associates a distinctive key with the e-mail copy and then stores the distinctive key with the e-mail copy. Author 14 then cites the e-mail with the distinctive key in the bibliography section of the manuscript. In reviewing the manuscript, audience 16 then transfers the distinctive key to database 18 via Internet 12 for requesting a copy of the cited e-mail for verification. Database 18 then transfers the e-mail copy to audience 16 in response to the request from the audience. Audience 16 may then review the e-mail copy for verification.

As can be readily understood, the reference material may be any type of material that can be stored by database 18. For example, any digital file can be stored by database 18. Similarly, traditional physical media such as paper books can also be stored in database 18 by scanning a portion or the entire paper book into a digital file. Further, audio/video files such as "ON24" news clips currently on the Internet may also be stored by database 18.

Further, the method and system in accordance with an embodiment of the present invention are useful with reference material that are kept in secrecy for a period of time. For example, reference material may be restricted from being distributed to audience 16 for a period of time. The reference material may be a completed manuscript having some sort of secrecy order or may be a partially finished manuscript that author 14 does not wish audience 16 to see until completed. Author 14 transfers the completed or partially finished reference material and information of when the reference material will be available to audience 16 to database 18. Database 18 stores and associates a distinctive key with the reference material and the reference material availability information. Audience 16 may then use the distinctive key to access database 18 for the reference material to review and verify. In response, database 18 transfers the reference material availability information to audience 16. If the reference material is not yet available to audience 16, then the reference material availability information may say that the reference material will be available in the future and request the audience to check back at the appropriate time. Upon the expiration of the time period and after author 14 has transferred a completed reference material to database 18, the database transfers to audience 16 upon request a copy of the reference material stored on the database.

Referring now to FIG. 5, an example of a bibliography section 70 in accordance with the method and system of an embodiment of the present invention is shown. Bibliography section 70 is attached to an end of a manuscript written by author 14. Author 14 uses bibliography section 70 to list all of the references that were cited in the manuscript. For instance, bibliography section 70 includes a website reference 72 (bibliography reference #1) having the address "www.WebSiteChannel.com" and the associated distinctive key "WebSiteChannelA1" as shown in FIG. 5. Bibliographic reference #2 is also a website. Similarly, bibliography section 70 includes a paper book reference 74 entitled "Engines" and authored by Heywood. Paper book reference 74 includes the distinctive key "Engines-Heywood" as shown in FIG. 5. Bibliography references #4, #5, and #6 are e-mail, digital audio file, and regular mail references.

Thus it is apparent that there has been provided, in accordance with the present invention, a method and system for using the Internet to archive and retrieve bibliography information and reference material cited in a manuscript that fully satisfy the objects, aims, and advantages set forth above. While the present invention has been described in conjunction with specific embodiments thereof, it is evident that many alternatives, modifications, and variations will be apparent to those skilled in the art in light of the foregoing description. Accordingly, it is intended to embrace all such alternatives, modifications, and variations as fall within the spirit and broad scope of the appended claims.

While embodiments of the present invention have been illustrated and described, it is not intended that these embodiments illustrate and describe all possible forms of the present invention. Rather, the words used in the specification are words of description rather than limitation, and it is understood that various changes may be made without departing from the spirit and scope of the present invention.

What is claimed is:

1. A method for archiving content from a website, the method comprising:
   receiving, at a database connected to the world wide web, a URL address identifying a website selected by a user that the user desires to reference;
   receiving, at the database, a request by the user to archive content from said reference website and a request by the user for a unique key to be associated with the requested archived website content;
   receiving at the database, a copy of the website content as it existed at the time the website identification was transferred to the database;
   assigning the unique key associated exclusively with the copy of the website content;
   storing the copy of the website content with the unique key in the database;
   the database receiving the unique key from a communication device via the web; and
   transferring a copy of the stored copy of the website portion from the database to the communication device via the web in response to the database receiving the unique key from the communications device.

2. The method of claim 1, wherein the stored copy of the website content is verbatim to the website content as it existed at the time the website identification was transferred to the database.

3. The method of claim 1, wherein the identification of the website is a URL internet address and wherein said unique key is not identical to said URL internet address.

4. The method of claim 1, wherein the unique key is hyperlinked to the website content stored in the database.

5. The method of claim 1 wherein the website content comprises a digital file.

6. The method of claim 5 wherein the digital file comprises a digital video file.

7. The method of claim 5 wherein the digital file comprises a userforum.

8. The method of claim 5 wherein the digital file comprises an e-mail.

9. The method of claim 1, further comprising a step of providing the unique key to the user via the Internet.

10. A method for archiving content from a website, the method comprising:
    a database receiving, from a first communication device via the Internet, a URL address identifying a website selected by a user that the user desires to reference and a request from the user to archive content from said website and a request by the user for a unique key to be associated with the requested archived website content;
    the database obtaining a copy of said website content from the Internet;
    the database storing a verbatim copy of the website content as that content of said website existed at the time the database obtained it;
    assigning the unique key associated exclusively with the stored copy of the website content;
    storing the unique key in the database;
    providing the unique key to the first communications device;
    the database receiving, from a second communication device via the Internet, the unique key; and the database transmitting to the second communication device a verbatim copy of the stored website content.

11. The method of claim 10, wherein said unique key is not identical to said URL address.

12. The method of claim 10, wherein the unique key is hyperlinked to the website content stored in the database.

13. The method of claim 10 wherein the website content comprises a digital file.

14. The method of claim 13 wherein the digital file comprises a digital video file.

15. The method of claim 14 wherein the digital file comprises a userforum.

16. The method of claim 13 wherein the digital file comprises an e-mail.

17. A method for archiving a digital file from the Internet, the method comprising:
- a database receiving, from a first communication device via the Internet, a copy of a digital file selected by a user that the user desires to reference and a request from a user to archive said digital file and a request by the user for a unique key to be associated with the requested archived digital content;
- copying and storing on the database, verbatim, the received digital file;
- assigning the unique key associated exclusively with the stored copy of said digital file;
- storing the unique key in the database;
- providing the unique key to the first communications device;
- the database receiving, from a second communication device via the Internet, the unique key; and
- the database transmitting to the second communication device a verbatim copy of the digital file.

18. The method of claim 17 wherein the database receives from the first communication device via the Internet a URL internet address associated with the received digital file, and wherein said unique key is not identical to said URL internet address.

19. The method of claim 18 wherein the digital file comprises website content.

20. The method of claim 17 wherein the unique key is hyperlinked to the digital file stored in the database.

21. The method of claim 20 wherein the digital file comprises website content.

22. The method of claim 17 wherein the digital file comprises website content.

23. A website archival and retrieval system comprising:
- a URL address selected by a user that identifies a target website that the user desires to reference;
- a first communication device connected to the Internet operated by a user;
- a database in communication with the first communication device via the Internet, said database not affiliated with the target website, the first communications device is configured to transmit to the database via the Internet a signal corresponding to the URL address of the target website and a request to archive said target website and a request for a unique key to be associated with the requested archived target website, the database further configured to obtain a copy of the target website from the Internet using the URL address, the database further configured to store a verbatim copy of the target website as that target website existed at the time the database received the URL address, the database further configured to store and to assign exclusively to the stored copy the unique key; the database further configured to provide the unique key to the user via the first communication device;
- a second communication device connected to the Internet operated by an audience and also in communication with the database, said second communication device configured to transmit the unique key to the database;
- wherein the database, in response to receiving the unique key from the second communications device, transmits to the second communication device the verbatim copy of the target website as the target website existed at the time the database received the URL address.

* * * * *